United States Patent [19]

Honda

[11] 4,117,363
[45] Sep. 26, 1978

[54] DC MOTOR

[76] Inventor: Keisuke Honda, 37, Shinyoshi-cho, Toyohashi-shi, Aichi-ken, Japan

[21] Appl. No.: 740,812

[22] Filed: Nov. 11, 1976

[30] Foreign Application Priority Data

Nov. 29, 1975 [JP] Japan .................................. 50-157200

[51] Int. Cl.² .......................................... H02K 13/00
[52] U.S. Cl. .................................... 310/219; 310/268; 310/231; 310/253
[58] Field of Search ............... 310/40, 46, 115 A, 219, 310/231, 268, 178, 248, 251-253

[56] References Cited

U.S. PATENT DOCUMENTS

| | | | |
|---|---|---|---|
| 2,553,292 | 5/1951 | Barrett | 310/40 |
| 2,812,454 | 11/1957 | Buck | 310/231 X |
| 3,348,086 | 10/1967 | Monma | 310/268 |
| 3,648,088 | 3/1972 | Wilkin et al. | 310/219 X |

Primary Examiner—Donovan F. Duggan
Attorney, Agent, or Firm—Burgess, Ryan and Wayne

[57] ABSTRACT

Disclosed is a DC motor comprising a rotor consisting of a rotary shaft, a disk carried by the rotary shaft coaxially thereof and a plurality of prefabricated coils mounted on the disk and equiangularly spaced apart from each other; brushes attached on the rotor and electrically connected to the coils and each consisting of carbon fibers; and a casing wherein commutator segments are mounted on the inner surface of the side wall of the casing and circumferentially equiangularly spaced apart from each other for sliding contact with the brushes and permanent magnets are mounted on the casing so as to surround or be surrounded by the coils in radially opposed relation therewith or to be in axially opposed relation therewith.

2 Claims, 6 Drawing Figures

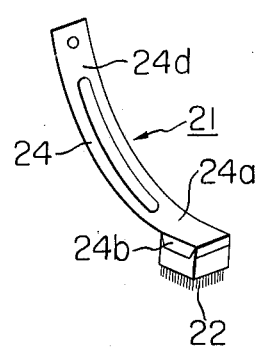
FIG. 2a
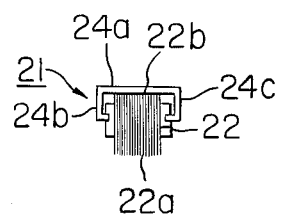
FIG. 2b
FIG. 3
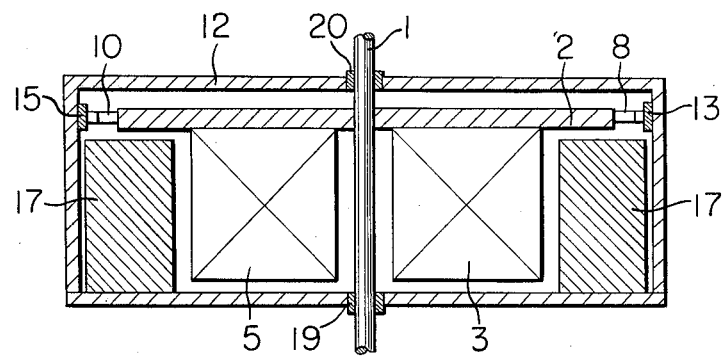
FIG. 4
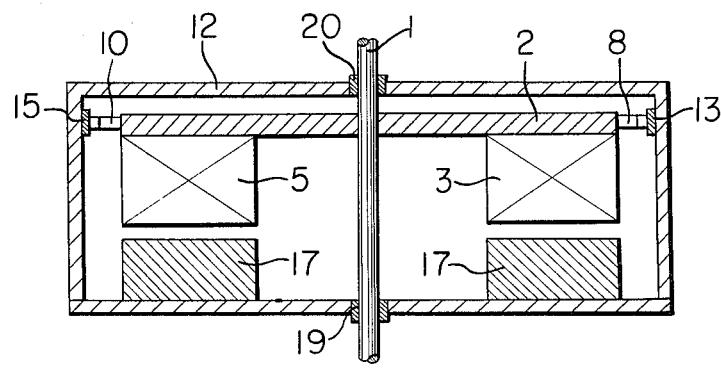

DC MOTOR

BACKGROUND OF THE INVENTION:

The present invention relates to a DC motor of the type wherein brushes are attached to a rotor and a commutator is mountd on a casing.

The rotors of the prior art DC motors have been in general assembled by securely attaching a core to a rotary shaft and winding conductors on the core to form coils and connecting the ends of the coils to the segments of a commutator mounted on the rotary shaft for contact with brushes mounted on a casing. With the above construction, it has been considerably difficult to wind the coils on the core carried by the rotary shaft. Furthermore, the step for mounting the commutator on the rotary shaft and the step for connecting the coils with the commutator have been both very complex and cumbersome. The prior art DC motors have a further defect that they have been using carbon brushes, electrographitic brushes, metallic graphite brushes and so on so that wear and abrasion of the commutators are very rapid.

SUMMARY OF THE INVENTION

One of the objects of the present invention is therefore to provide a DC motor wherein prefabricated coils are mounted on a disk, whereby the automatic assembly may be much facilitated.

Another object of the present invention is to provide a DC motor wherein a rotor has a small thickness in the axial direction and a large diameter so that high torque may be produced.

A further obejct of the present invention is to provide a DC motor wherein brushes are made of carbon fibers so that the noise problem may be substantially eliminated and the wear and abrasion of the commutator may be minimized, whereby the long service life may be ensured and the overall cost may be reduced.

Briefly stated, to the above and other ends the present invention provides a DC motor comprising a rotor consisting of a rotary shaft, a disk mounted on the rotary shaft coaxially thereof, a plurality of prefabricated coils mounted on the disk; brushes attached to the rotor and each consisting of carbon fibers; and a casing wherein permanent magnets are mounted in opposed relation with the coils and commutator segments are also mounted for slidable contact with the brushes.

BRIEF DISCRIPTION OF THE DRAWINGS:

FIGS. 1(a) and 1(b) are a horizontal and a vertical sectional views, respectively, of a first embodiment of the present invention.

FIG. 2(a) is a perspective view of a brush;

FIG. 2(b) is an end view, partly in section, thereof; and

FIGS. 3 and 4 are vertical sectional views of a second and third embodiments, respectively, of the present invention.

Figure 1A:
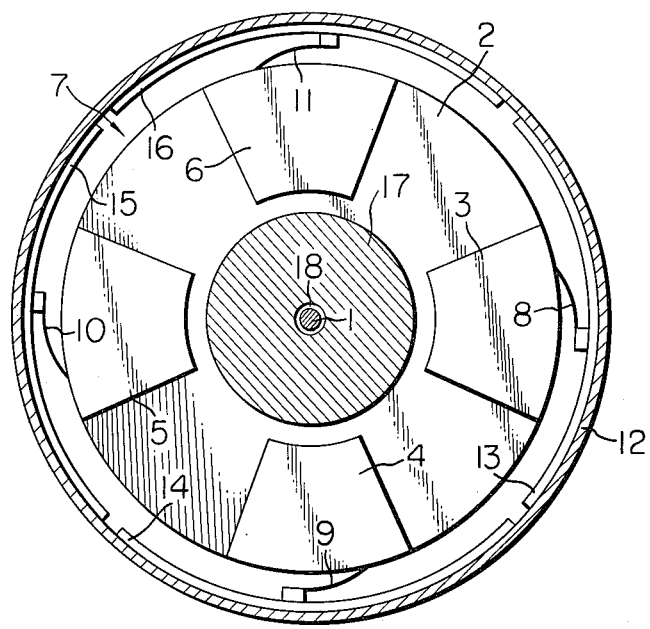
Figure 1B:
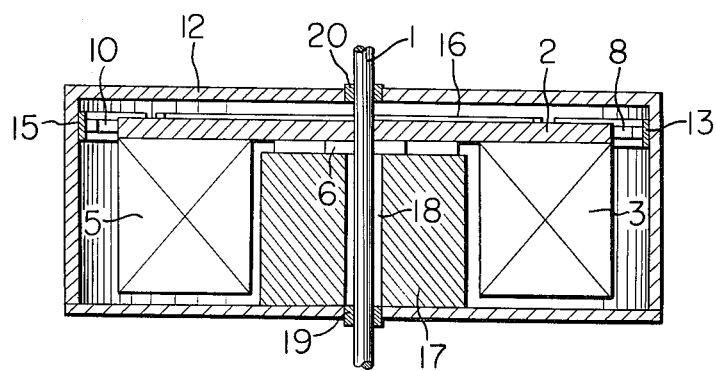

DESCRIPTION OF THE PREFERRED EMBODIMENTS:

First Embodiment, FIGS. 1 and 2

Referring to FIG. 1, a DC motor in accordance with the present invention has a rotor 7 comprising a rotary shaft 1, a disk 2 carried by the rotary shaft 1 coaxially thereof, four coils 3, 4, 5 and 6 equiangularly spaced apart from each other and mounted on one major surface of the disk 2, and brushes 8, 9, 10 and 11 attached to the outer peripheral sides of the disk 2 or the coils 3 through 6. The DC motor further includes a hollow cylindrical casing 12 in which four commutator segments 13, 14, 15 and 16 for slidable contact with the brushes 8 through 11 of the rotor 7 are attached to the inner surface of the side wall of the casing 12 and equiangularly spaced apart from each other and a cylindrical permanent magnet 17 with a center hole 18 is attached to the inner surface of one side wall of the casing 12 coaxially thereof. The rotary shaft 1 of the rotor 7 is extended through the center hole 18 of the permanent magnet 17 and is rotatably supported at its ends in bearings 19 and 20 which in turn are mounted on the side walls of the casing 12.

The brushes 8 through 11 are similar in construction as shown in detail in FIG. 2. A brush generally indicated by 21 consists of an arm 24 made of an elastic material such as phosphor bronze and a bundle of carbon fibers 22 securely held together intermediate at the ends thereof with a holder 23 made of rubber or synthetic resin. The upper end of the carbon fiber bundle 22 is firmly made into contact with the arm 24 at one end thereof, and the bundle 22 is securely attached to the arm 24 with retaining projections 24b and 24c as best shown in FIG. 2(b). The other end 24d of the arm 24 is securely attached to the rotor 7 or coil 3, 4, 5 or 6.

In the first embodiment, the coil 3 through 6 are prefabricated and mounted on the disk 2 so that the assembly may be much facilitated and consequently the automatic assembly may be feasible. Furthermore the thickness of the rotor 7 may be considerably reduced while the diameter thereof may be increased so that high torque may be produced. Since the brush consists of a large number of carbon fibers, noise production may be minimized and the long service life may be ensured. Moreover the overall production cost may be considerably decreased.

Second Embodiment, FIG. 3

The second embodiment shown in cross section in FIG. 3 is substantially similar to the first embodiment shown in FIG. 1 except that a plurality of permanent magnets 17 are equiangularly arranged and attached on the inner surface of one end wall of the casing in such a way that they surround the coils 3 through 6 mounted on the disk 2.

Third Embodiment, FIG. 4

The third embodiment shown in FIG. 4 is also substantially similar in construction to the first embodiment except that a plurality of permanent magnets 17 are equiangularly spaced apart from each other and mounted on the inner surface of one side wall of the casing in axially opposed relation with the coils 3 through 6 in the axial direction.

To mode of operation of both the second and third embodiment is same with that of the first embodiment described above. It is assumed that four permanent magnets 17 be arranged in such a way that the adjacent ends have opposite polarities. Current flows through the commutator segments 13 through 16 and brushes 8 through 11 into the coils 3 through 6 so that the latter are energized in such a way their polarities are opposite to those of the permanent magnets 17 in opposed relation but are same with those of the poles next to the opposed permanent magnets. As a result, the rotor 7 starts rotation. It will be understood that instead of four coils, brushes and commutator segments, any number of them may be employed.

What is claimed is:

1. A direct current motor, comprising:
   a hollow casing having a cylindrical side wall and first and second opposed end walls on opposite ends of said side wall, said casing having aligned holes in said end walls coinciding with the central longitudinal axis of said side wall;
   a rotatable shaft disposed along said axis, extending into said casing through said holes, and bearing means secured to each end wall adjacent the corresponding hole for facilitating rotational movement of said shaft with respect thereto;
   a rotor assembly comprising a disk disposed within said casing adjacent said first end wall and axially mounted on said shaft for rotation therewith, the periphery of said disk being adjacent the interior surface of the side wall of said casing;
   a number of armature coils secured to said disk and extending toward the second end wall of the casing, said coils being equiangularly spaced about said shaft;
   a field magnet structure comprising a plurality of permanent magnets secured to said second end wall of said casing and disposed adjacent to and coaxial with said armature coils;
   a commutator comprising a plurality of commutator segments mounted on the inner surface of the side wall of said casing and equiangularly spaced apart with respect to said shaft; and
   a corresponding plurality of brushes affixed to said rotor assembly adjacent the periphery of said disk and extending to said commutator, each brush having an arcuate resilient arm and an end portion for slidably contacting the segments of said commutator.

2. The motor according to claim 1, wherein the end portion of each brush comprises a multiplicity of carbon fibers.

* * * * *

UNITED STATES PATENT OFFICE
CERTIFICATE OF CORRECTION

Patent No. 4,117,363    Dated September 26, 1978

Inventor(s) Keisuke Honda

It is certified that error appears in the above-identified patent and that said Letters Patent are hereby corrected as shown below:

Column 1, line 34: "obejct" should be --object-- line 49: "DISCRIPTION" should be --DESCRIPTION--

Column 2, line 28: "coil" should be --coils-- line 58: "To" should be --The--

Signed and Sealed this

Twenty-fourth Day of April 1979

[SEAL]

Attest:

RUTH C. MASON
Attesting Officer

DONALD W. BANNER
Commissioner of Patents and Trademarks